H. G. RENNER.
TRAP.
APPLICATION FILED AUG. 19, 1913.
1,104,315.
Patented July 21, 1914.
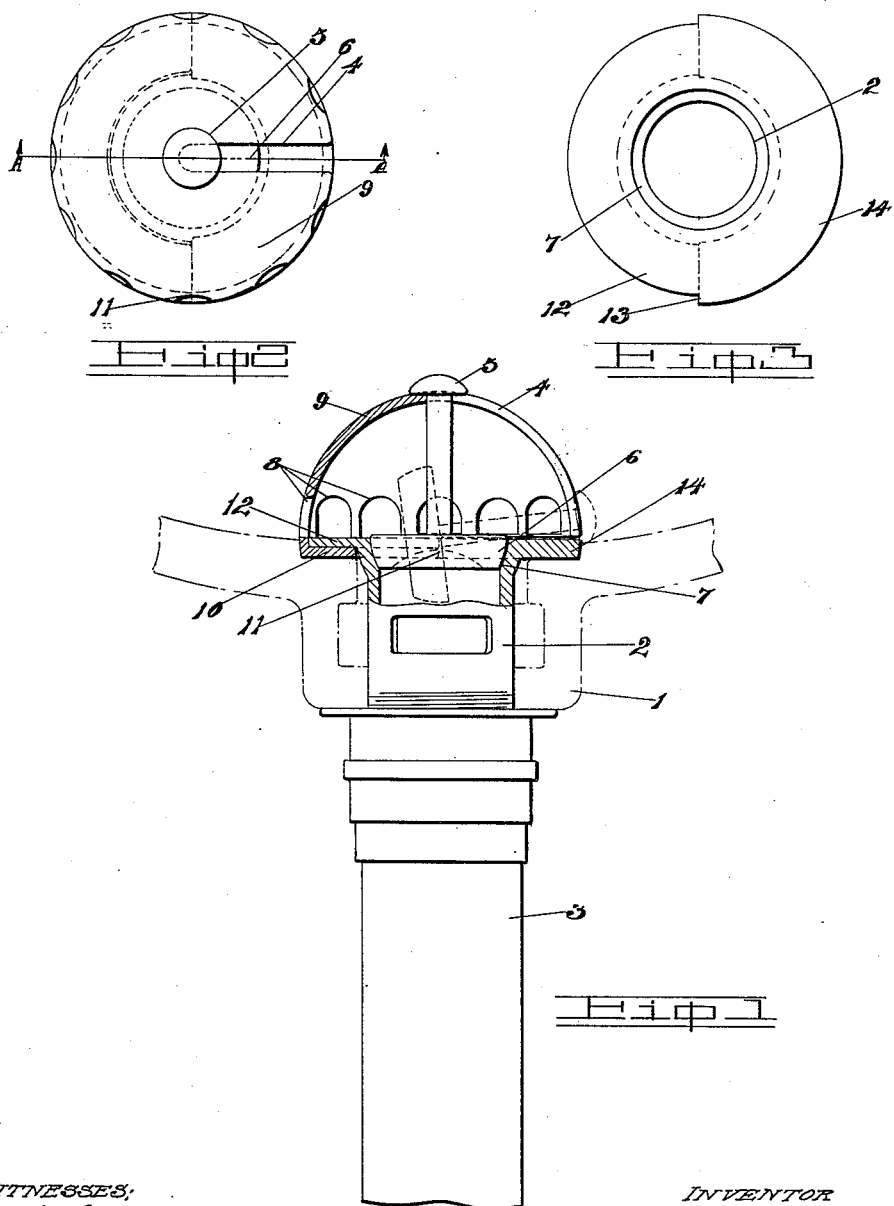

HOMER G. RENNER, OF PORTLAND, OREGON.

TRAP.

1,104,315. Specification of Letters Patent. Patented July 21, 1914.

Application filed August 19, 1913. Serial No. 785,485.

*To all whom it may concern:*

Be it known that I, HOMER G. RENNER, a citizen of the United States, residing at Portland, in the county of Multnomah and State of Oregon, have invented certain new and useful Improvements in Traps, of which the following is a specification.

This invention relates to traps and has for its object to provide a trap plug for lavatories, bath-tubs and the like, having a strainer detachably secured thereon.

A further object is to provide in a device of the kind described a strainer, or guard which will protect the waste opening, and which will at the same time accommodate the waste plug, retaining it at all times in position to be seated and permitting an easy manipulation to open and close the outlet.

I accomplish the objects indicated by means of the structure illustrated in the accompanying drawing, in which—

Figure 1 is a side elevation showing a drain pipe as connected to a lavatory, a fragmentary portion of which is shown in dotted lines, the trap plug and guard being shown in vertical section on the line A—A of Fig. 2, to show the interior. Fig. 2 is a plan view of the guard. Fig. 3 is a plan view of the spud, or trap plug.

Describing the drawing in detail, 1 designates the seat of the usual lavatory in which the trap plug 2 is seated, and connected in the usual manner with the drain 3.

Superposed upon the trap plug is a guard 9 consisting of a shell made hemispherical in form and adapted to seat in the recess about the lavatory opening. About the base of the guard is a series of openings 8 formed flush with the inner surface of the lavatory to allow of perfect drainage.

An inwardly extending flange 10 is formed about the edge of one half of the guard to form a seat for the flange 12 of the trap plug, the opposite half of the guard being cut away to a height corresponding to the thickness of the flange 12, to permit the insertion of the latter. The corresponding portion of the flange 12 will be made thicker, as at 14, so as to fill the space cut from the base of the guard and neatly fit the seat of the lavatory, when the plug is secured in place against the end 11 of the flange. Before inserting the trap plug, the waste plug 6 will be placed within the guard with the shank thereof extending through the quadrant slot 4 in the guard. This shank will be of a length to allow the waste plug to seat freely in the opening 7 of the trap plug, so that when it is in vertical position the flow of the water will aid in closing the outlet. To discharge the lavatory the knob 5 will be drawn to the base of the guard, as seen in dotted lines, tilting the waste plug to vertical position and opening the outlet. By this arrangement a neat guard to the trap is provided and the waste plug is retained in position for use whenever needed, and it cannot be removed and lost.

Various alterations in the form or design of the device shown may be made within the province of the mechanic, but all of which are within the spirit and principle of my invention.

Having described my invention, what I claim, is:

1. A device of the kind described, comprising a trap plug, a guard detachably secured upon the plug, said guard consisting of a hemispherical casing having a series of peripheral openings and a vertical slot in one side rising to its center, a waste plug within the guard, a stem rising from the waste plug through said vertical slot, and a cap conforming to the surface of the guard fixed upon the stem across said slot, whereby the stem may be moved to vertical position to seat the plug, or to horizontal position to unseat it.

2. In a device of the kind described a trap plug having one portion of its flange formed in double thickness, a guard comprising a hemispherical casing having an inwardly extending flange about its edge to form a seat for the reduced portion of the plug flange and provided with a series of peripheral openings and a vertical slot, and a waste plug within said guard adapted to seat within the trap plug and having a shank extending through said slot, by means of which the waste plug may be seated and removed.

In testimony whereof I affix my signature in presence of two witnesses.

HOMER G. RENNER.

Witnesses:
E. EARL FEIKE,
LONA WARD.

Copies of this patent may be obtained for five cents each, by addressing the "Commissioner of Patents, Washington, D. C."